US008467727B2

(12) United States Patent
Haartsen

(10) Patent No.: US 8,467,727 B2
(45) Date of Patent: Jun. 18, 2013

(54) CONTROLLING THE DYNAMIC RANGE OF A RF RECEIVER CIRCUIT IN A WIRELESS COMMUNICATION TERMINAL TO REESTABLISH A LOST COMMUNICATION LINK

(75) Inventor: Jacobus Cornelis Haartsen, Hardenberg (NL)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 1261 days.

(21) Appl. No.: 12/250,883

(22) Filed: Oct. 14, 2008

(65) Prior Publication Data
US 2010/0069005 A1 Mar. 18, 2010

Related U.S. Application Data

(60) Provisional application No. 61/096,953, filed on Sep. 15, 2008.

(51) Int. Cl.
H04B 7/00 (2006.01)
H04B 17/00 (2006.01)

(52) U.S. Cl.
USPC .......... 455/41.3; 455/41.2; 455/67.11

(58) Field of Classification Search
USPC .......... 455/41.3, 41.2, 67.11, 63.1, 241.1, 455/234.1
See application file for complete search history.

(56) References Cited

U.S. PATENT DOCUMENTS

| | | | |
|---|---|---|---|
| 7,457,617 B2 * | 11/2008 | Adams et al. | 455/418 |
| 2001/0001616 A1 | 5/2001 | Rakib et al. | |
| 2003/0025623 A1 | 2/2003 | Brueske et al. | |
| 2005/0208961 A1 | 9/2005 | Willenegger | |
| 2006/0040630 A1 | 2/2006 | Mostov et al. | |
| 2006/0220935 A1 | 10/2006 | Hughes et al. | |

FOREIGN PATENT DOCUMENTS

| | | |
|---|---|---|
| EP | 1 303 053 A1 | 4/2003 |
| EP | 1 306 977 A2 | 5/2003 |
| EP | 1 306 977 A3 | 5/2003 |
| EP | 1 326 347 A2 | 7/2003 |
| EP | 1 326 347 A3 | 7/2003 |
| WO | WO 99/30427 A1 | 6/1999 |
| WO | WO 2004/042937 A2 | 5/2004 |
| WO | WO 2004/093314 A2 | 10/2004 |

OTHER PUBLICATIONS

Notification of Transmittal of the International Search Report and the Written Opinion of the International Searching Authority, or the Declaration; International Search Report; Written Opinion of the International Searching Authority, PCT/IB2009/051073, Jun. 23, 2009.

Taiwanese Office Action Corresponding to Taiwanese Patent Application No. 098123643; Dated: Nov. 14, 2012; 13 Pages.

* cited by examiner

Primary Examiner — Eugene Yun
(74) Attorney, Agent, or Firm — Myers Bigel Sibley & Sajovec, P.A.

(57) ABSTRACT

A wireless communication terminal includes a RF receiver circuit and a controller. The RF receiver circuit receives communication signals from another communication terminal through a wireless communication link when the communication signals are within a dynamic range of the RF receiver circuit. The controller controls the RF receiver circuit to temporarily increase the dynamic range of the RF receiver circuit in response to detecting an unexpected loss of the wireless communication link between the other communication terminal and the RF receiver circuit. The controller then controls the RF receiver circuit to decrease the dynamic range of the RF receiver circuit in response to detecting that the wireless communication link between the other communication terminal and the RF receiver circuit has been reestablished.

20 Claims, 5 Drawing Sheets

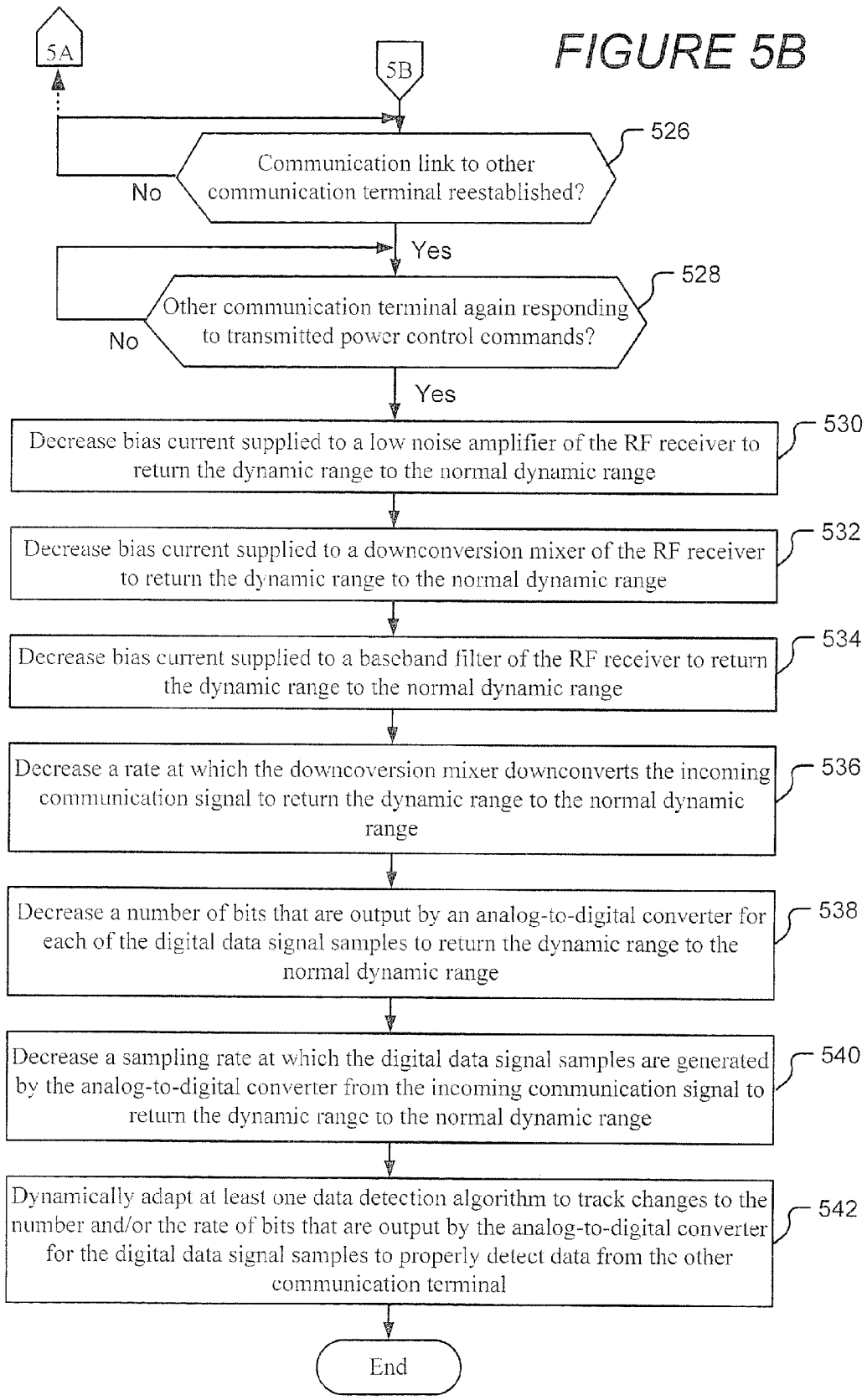

CONTROLLING THE DYNAMIC RANGE OF A RF RECEIVER CIRCUIT IN A WIRELESS COMMUNICATION TERMINAL TO REESTABLISH A LOST COMMUNICATION LINK

CROSS REFERENCE TO RELATED APPLICATION

The present application claims the benefit of and priority to U.S. Provisional Patent Application No. 61/096,953, filed Sep. 15, 2008, entitled "CONTROLLING THE DYNAMIC RANGE OF RF RECEIVER CIRCUITRY IN A WIRELESS COMMUNICATION TERMINAL TO REESTABLISH A LOST COMMUNICATION LINK," the disclosure of which is hereby incorporated herein by reference in its entirety.

FIELD OF THE INVENTION

The present invention relates to electronic wireless communication terminals and, more particularly, to controlling transceiver circuitry that establishes wireless communication links between wireless communication terminals.

BACKGROUND OF THE INVENTION

Wireless piconets are widely used to allow short-range, ad-hoc wireless communications between adjacent terminals. Bluetooth is a well known short-range wireless piconet standard that can allow many terminals to be connected together in a short-range ad-hoc piconet. For example, Bluetooth-enabled terminals are widely used to allow a headset to wirelessly communicate with a mobile telephone, a mobile telephone to communication through a vehicle sound system, and for terminals to exchange digital audio, pictures, and/or video data.

In a short-range wireless piconet, one terminal generally operates as a master device, and one or more other terminals operate as slave devices. For example, the Bluetooth headset may be a slave, whereas the mobile telephone, vehicle sound system, digital audio device, computer, PDA, etc., may be the master.

Because terminals that are communicating through a short-range wireless piconet are located relatively close to one another, moving the terminals small distances relative to one another can result in significant changes in the strength of the communication signals that they receive from each other. In an attempt to compensate for changes in received signal strength, some Bluetooth terminals are configured to control the transmission power level of each other via their exchange of power control commands. Existing power control processes may not sufficiently control power levels when the terminals are rapidly moved relative to each other, and which can result in loss of communication links between the terminals.

SUMMARY OF THE INVENTION

In some embodiments of the present invention, a wireless communication terminal includes a RF receiver circuit and a controller. The RF receiver circuit is configured to receive communication signals from another communication terminal through a wireless communication link when the communication signals are within a dynamic range of the RF receiver circuit. The controller is configured to control the RF receiver circuit to temporarily increase the dynamic range of the RF receiver circuit in response to detecting an unexpected loss of the wireless communication link between the other communication terminal and the RF receiver circuit, and to control the RF receiver circuit to decrease the dynamic range of the RF receiver circuit in response to detecting that the wireless communication link between the other communication terminal and the RF receiver circuit has been reestablished.

By temporarily increasing the dynamic range of the RF receiver circuit after loss of the communication link, the terminal may be able to again receive communication signals from the other terminal and may, thereby, reestablish the communication link to the other terminal. Once the communication link has been reestablished, the terminal can then control the RF receiver circuit to decrease its dynamic range while maintaining the communication link to the other terminal.

In some further embodiments, the RF receiver circuit can include a low noise amplifier with a transistor circuit that is configured to amplify an incoming communication signal from the other communication terminal. The controller can be configured to increase bias current that is supplied to the transistor circuit of the low noise amplifier to increase the dynamic range of the RF receiver circuit in response to detecting the unexpected loss of the wireless communication link. The controller can then decrease the bias current that is supplied to the transistor circuit of the low noise amplifier to decrease the dynamic range of the RF receiver circuit back in response to detecting that the wireless communication link between the other communication terminal and the RF receiver circuit has been reestablished.

In some further embodiments, the RF receiver circuit can include a low noise amplifier that amplifies an incoming communication signal from the other communication terminal. The controller can be further configured to increase a power supply voltage to the low noise amplifier to increase the dynamic range of the RF receiver circuit in response to detecting the unexpected loss of the wireless communication link, and to decrease the power supply voltage to the low noise amplifier to decrease the dynamic range of the RF receiver circuit in response to detecting that the wireless communication link between the other communication terminal and the RF receiver circuit has been reestablished.

In some further embodiments, the RF receiver circuit can include a downconversion mixer with a transistor circuit that down-converts an incoming communication signal from the other communication terminal to a baseband frequency. The controller can be further configured to increase bias current that is supplied to the transistor circuit of the downconversion mixer to increase the dynamic range of the RF receiver circuit in response to detecting the unexpected loss of the wireless communication link. The controller can then decrease the bias current that is supplied to the transistor circuit of the downconversion mixer to decrease the dynamic range of the RF receiver circuit in response to detecting that the wireless communication link between the other communication terminal and the RF receiver circuit has been reestablished.

In some further embodiments, the RF receiver circuit can include a downconversion mixer that down-converts an incoming communication signal from the other communication terminal to a baseband frequency. The controller can be further configured to increase a rate at which the downconversion mixer downconverts the incoming communication signal to increase the dynamic range of the RF receiver circuit beyond the normal dynamic range in response to detecting the unexpected loss of the wireless communication link. The controller can then decrease the rate at which the downconversion mixer downconverts the incoming communication signal to decrease the dynamic range of the RF receiver circuit in response to detecting that the wireless communication link between the other communication terminal and the RF receiver circuit has been reestablished.

In some further embodiments, the RF receiver circuit can include a baseband filter that filters an incoming communication signal from the other communication terminal, which has been downconverted to a baseband signal, to generate a filtered baseband signal. The controller can be further configured to increase bias current that is supplied to the baseband filter to increase the dynamic range of the RF receiver circuit beyond the normal dynamic range in response to detecting the unexpected loss of the wireless communication link. The controller can then decrease the bias current that is supplied to the baseband filter to decrease the dynamic range of the RF receiver circuit in response to detecting that the wireless communication link between the other communication terminal and the RF receiver circuit has been reestablished.

In some further embodiments, the RF receiver circuit can include a low noise amplifier, a downconversion mixer, and a filter. The low noise amplifier can be configured to amplify an incoming communication signal from the other communication terminal. The downconversion mixer can be configured to down-convert an incoming communication signal from the other communication terminal to a baseband frequency. The baseband filter can be configured to filter the baseband frequency communication signal to generate a filtered baseband signal. The controller can be further configured to increase the dynamic range of the low noise amplifier, the downconversion mixer, and/or the baseband filter in response to detecting the unexpected loss of the wireless communication link. The controller can then decrease the dynamic range of the low noise amplifier, the downconversion mixer, and/or the baseband filter in response to detecting that the wireless communication link between the other communication terminal and the RF receiver circuit has been reestablished.

In some further embodiments, the RF receiver circuit can include an analog-to-digital converter that samples an incoming communication signal from the other communication terminal, which has been downconverted to a baseband signal, to generate a sequence of digital data signal samples. The controller can be further configured to increase a number of bits that are output by the analog-to-digital converter for each of the digital data signal samples to increase the dynamic range of the RF receiver circuit in response to detecting the unexpected loss of the wireless communication link. The controller can then decrease the number of bits that are output by the analog-to-digital converter for each of the digital data signal samples to decrease the dynamic range of the RF receiver circuit in response to detecting that the wireless communication link between the other communication terminal and the RF receiver circuit has been reestablished.

In some further embodiments, the controller can be further configured to carry out at least one data detection algorithm to detect data bits from the other communication terminal in the sequence of digital data signal samples, and to dynamically adapt the at least one data detection algorithm to track changes to the number of bits that are output by the analog-to-digital converter for each of the digital data signal samples to cause the data detection algorithm to be able to properly detect data bits from the other communication terminal. The at least one data detection algorithm can include a Viterbi data detection algorithm. The controller can be configured to vary convergence lengths of the Viterbi data detection algorithm to track changes to the number of bits that are output by the analog-to-digital converter for each of the digital data signal samples.

In some further embodiments, the RF receiver circuit can include an analog-to-digital converter that samples an incoming communication signal from the other communication terminal, which has been downconverted to a baseband signal, to generate a sequence of digital data signal samples. The controller can be further configured to respond to detecting the unexpected loss of the wireless communication link by increasing a sampling rate at which the digital data signal samples are generated by the analog-to-digital converter from the incoming communication signal, and to respond to detecting that the wireless communication link between the other communication terminal and the RF receiver circuit has been reestablished by decreasing the sampling rate at which the digital data signal samples are generated by the analog-to-digital converter from the incoming communication signal.

In some further embodiments, the controller can be further configured to carry out at least one data detection algorithm to detect data bits from the other communication terminal in the sequence of digital data signal samples, and to dynamically adapt the at least one data detection algorithm to track changes to the sampling rate of the analog-to-digital converter to cause the data detection algorithm to be able to properly detect data bits from the other communication terminal.

In some further embodiments, the RF receiver circuit can include Bluetooth receiver circuit that is configured to operate to establish a Bluetooth communication link with the other communication terminal. The controller can be further configured to respond to detecting an unexpected loss of the Bluetooth communication link by controlling the Bluetooth receiver circuit to temporarily increase the dynamic range of the Bluetooth receiver circuit, and respond to detecting reestablishment of the Bluetooth communication link with the other communication terminal by controlling the Bluetooth receiver circuit to decrease the dynamic range of the RF receiver circuit.

In some further embodiments, the controller can be further configured to determine that the wireless communication link has become unexpectedly lost when a communication response is not received from the other communication terminal within a threshold time after transmission of data from the wireless communication terminal to the other communication terminal.

In some further embodiments, the controller can be further configured to determine that the wireless communication link has become unexpectedly lost when bit errors in a data packet received from the other communication terminal exceeds a threshold number.

In some further embodiments, the controller can be further configured to transmit power control commands to the other communication terminal to control a transmission power level from the other communication terminal, and can be configured to delay controlling the RF receiver circuit to decrease the dynamic range of the RF receiver circuit back until after detecting that the wireless communication link between the other communication terminal has been reestablished and after determining that the other communication terminal is again responding to the transmitted power control commands.

In some other embodiments, a method of operating a communication terminal includes receiving communication signals from another communication terminal through a wireless communication link when the communication signals are within a dynamic range of a RF receiver circuit. The RF receiver circuit is controlled to temporarily increase the dynamic range of the RF receiver circuit in response to detecting an unexpected loss of the wireless communication link between the other communication terminal and the RF receiver circuit. The RF receiver circuit is controlled to decrease the dynamic range of the RF receiver circuit in response to detecting that the wireless communication link between the other communication terminal and the RF receiver circuit has been reestablished.

In some further embodiments, power control commands can be transmitted to the other communication terminal to control a transmission power level from the other communication terminal. Control of the RF receiver circuit to decrease the dynamic range of the RF receiver circuit can be delayed until after detecting that the wireless communication link between the other communication terminal has been reestablished and after determining that the other communication terminal is again responding to the transmitted power control commands.

In some other embodiments, a wireless communication terminal includes a low noise amplifier, a downconversion mixer, a baseband filter, and a controller. The low noise amplifier is configured to amplify a communication signal that is incoming from another communication terminal through a wireless communication link. The downconversion mixer is configured to down-convert the amplified communication signal to generate a baseband frequency communication signal. The baseband filter is configured to filter the baseband frequency communication signal to generate a filtered baseband signal. The controller is configured to increase bias current that is supplied to the low noise amplifier, to the downconversion mixer, and/or to the baseband filter to increase their dynamic range in response to detecting an unexpected loss of the wireless communication link. The controller can then decrease the bias current that is supplied to the low noise amplifier, to the downconversion mixer, and/or to the baseband filter to decrease their dynamic range back in response to detecting that the wireless communication link has been reestablished.

In some other embodiments, a wireless communication terminal includes a RF receiver circuit and a controller. The RF receiver circuit is configured to receive communication signals from another communication terminal through a wireless communication link when the communication signals are within a dynamic range of the RF receiver circuit. The controller is configured to control the RF receiver circuit to temporarily increase the dynamic range of the RF receiver circuit while carrying out a page scan to establish a communication link with another communication terminal, and to control the RF receiver circuit to decrease the dynamic range of the RF receiver circuit in response to establishing the communication link with the other communication terminal.

In some further embodiments, the RF receiver circuit includes a low noise amplifier, a downconversion mixer, and a baseband filter. The low noise amplifier is configured to amplify a communication signal that is incoming from another communication terminal through a wireless communication link. The downconversion mixer is configured to down-convert the amplified communication signal to generate a baseband frequency communication signal. The baseband filter is configured to filter the baseband frequency communication signal to generate a filtered baseband signal. The controller is further configured to increase dynamic range of the low noise amplifier, the downconversion mixer, and/or the baseband filter while carrying out the page scan to establish the communication link with the other communication terminal.

BRIEF DESCRIPTION OF THE DRAWINGS

The accompanying drawings, which are included to provide a further understanding of the invention and are incorporated in and constitute a part of this application, illustrate certain embodiments of the invention. In the drawings:

FIGS. 5A and 5B illustrate a flowchart of further operations that may be performed by a controller in the wireless communication terminal of FIG. 1 to control dynamic range of the RF receiver circuit according to various embodiments.

DETAILED DESCRIPTION OF EMBODIMENTS OF THE INVENTION

Figure 1:
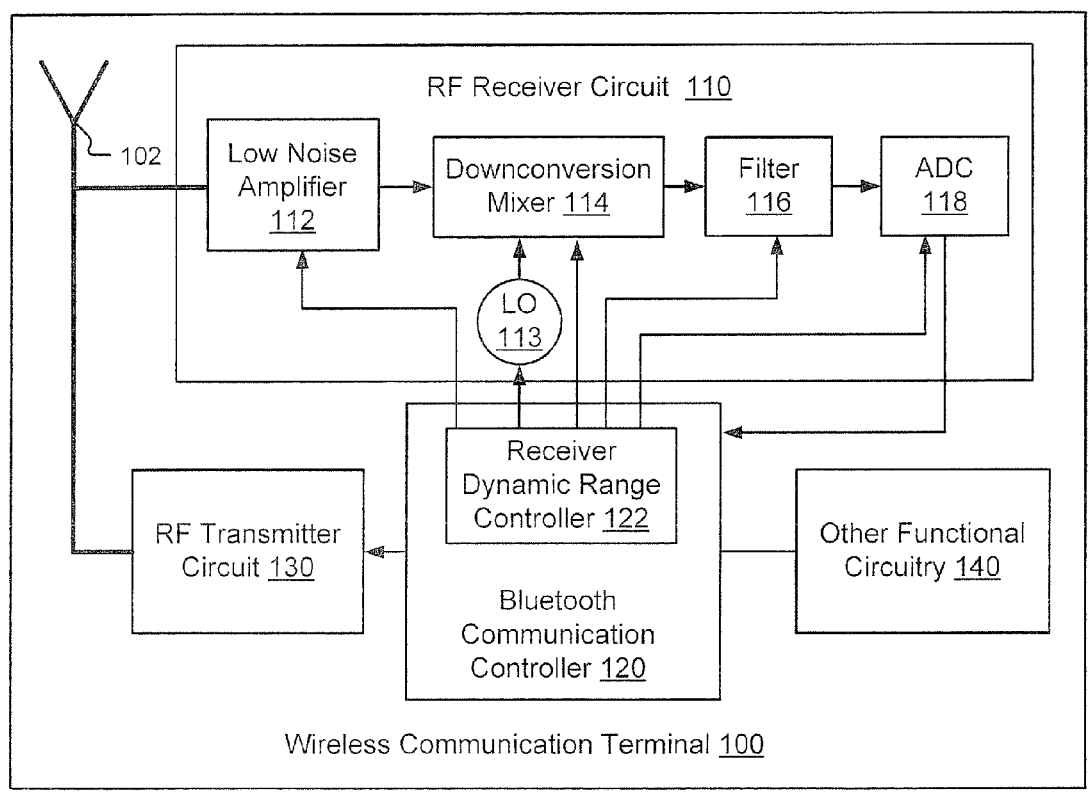
FIG. 1 is a schematic diagram illustrating a wireless communication terminal that includes a RF receiver circuit having a dynamic range that is controlled in accordance with some embodiments of the present invention.

The present invention now will be described more fully hereinafter with reference to the accompanying figures, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, third, etc. may be used herein to describe various elements, these elements should not be limited by these terms. These terms are only used to distinguish one element from another.

The present invention is described below with reference to block diagrams and/or flowchart illustrations of methods, apparatus (systems and/or terminals) and/or computer program products according to embodiments of the invention. It is understood that a block of the block diagrams and/or flowchart illustrations, and combinations of blocks in the block diagrams and/or flowchart illustrations, can be implemented by hardware and/or in software (including firmware, resident software, micro-code, etc.), referred to herein as "circuitry" or "circuit". For example, some of the functionality my be implemented in computer program instructions that may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks. The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

A computer-usable or computer-readable medium may be, for example but not limited to, an electronic, magnetic, optical, electromagnetic or semiconductor system, apparatus or terminal. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Although some of the diagrams include arrows on communication paths to show a primary direction of communication, it is to be understood that communication may occur in the opposite direction to the depicted arrows.

As used herein, a "wireless communications terminal" may include a Bluetooth, cellular, wireless local area network (WLAN), and/or other wireless communications capabilities, and may combine voice and/or data communications capabilities.

Various embodiments of the present invention are described herein in the context of a wireless communication terminal that includes Bluetooth communications capabilities. However the invention is not limited thereto, as it may be incorporated within other types of wireless communications terminals.

For example, other embodiments of the invention may be used in terminals that include WLAN communication capabilities and/or cellular communication capabilities. A cellular communication terminal may be configured to communicate according to one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS).

In Bluetooth communications terminals, the transmission power level of a transmitting (TX) terminal is controlled to reduce the dynamic range (DR) requirements at a receiving (RX) terminal. The dynamic range of the receiving terminal corresponds on the high end to the maximum receivable level and on the low end by the minimum receivable level of a communication signal from a coupled antenna.

For communications terminals that are communicating through a Bluetooth piconet link therebetween, the link between the terminals may be lost if any of their receiver circuitry gets out of range and the received radio signal drops below the minimum detection level. For short-range radio communications, such as Bluetooth, the link can also be lost when the received signal has become too strong because of the close proximity between the terminals, which can cause the front-end receiver circuit to become saturated due to non-linearities and result in an inability to detect received signals.

For short-range radio communications, the communication link loss (e.g., the minimum propagation loss between the antenna of the transmitter terminal and the antenna of the receiver terminal) can be very small (e.g. less than about 3 dB) because the transmitting and receiving terminals can be in very close proximity (e.g. a few cm) to each other. Because most Bluetooth receivers have a maximum receiving level of −20 to −10 dBm, they must be able to regulate the transmitter power level so as to be at a very low level (e.g., below about −10 dBm).

The transmission power may be controlled in an attempt to keep the received signal level within the upper and lower operational range of the receiver circuit of the receiving terminal. A problem can arise when the propagation loss varies very quickly with respect to the rate at which the transmitter power is controlled. If a short-range link becomes lost, the terminals may not know whether the signal is too weak (in which case the transmitting terminal should increase its transmission power) or is too strong (in which case the transmitting terminal should decrease its transmission power).

For example, during a Bluetooth sniff mode a pair of terminals may only communicate every 1.28 seconds, or at even longer time intervals, when the Bluetooth communication circuit temporarily wakes up (e.g., powers on). Accordingly, if the terminals are rapidly moving relative to one another, during the Bluetooth sniff mode the power level of a transmitting terminal may not adequately track the change in communication coupling loss and may, thereby, result in the received power level becoming outside the dynamic range of the receiver circuit of the receiving terminal and cause a loss of the communication link between the terminals. The receiving terminal may not have a way to determine whether to request that the transmitting terminal increase or decrease its transmission power level to enable reestablishment of the communication link therebetween.

Various embodiments of the present invention may arise from the realization that when a short-range communication link is lost, it may be reestablished by temporarily increasing the dynamic range of the receiver circuit until the link has been restored and the transmission power is once again controlled, after which the dynamic range of the receiver circuit can be decreased.

For example, in some embodiments, in response to the loss of a link, the dynamic range of the receiver circuit is temporarily increased above a normal operating range by increasing the power that is supplied to the receiver front-end circuit and/or controlling other operational parameters of the receiver front-end circuit. In response to restoring the link, the dynamic range of the receiver circuit is decreased by decreasing the power that is supplied to the receiver front-end circuit and/or decreasing the other operational parameters of the receiver front-end circuit.

Because the dynamic range of the receiver circuit is dynamically controlled, the receiver circuit may be operated with a smaller normal dynamic range (i.e., during normal communications through the communication link), which may reduce the power consumption of the receiver circuit while the communication link is being maintained. Although loss of the communication link results in a temporary increase in the dynamic range of the receiver circuit and may cause a corresponding increase in power consumption in the receiver, the increased power consumption is only temporary while the link is being reestablished.

Embodiments of the present invention will now be described with reference to FIG. 1. FIG. 1 is a schematic diagram illustrating a wireless communication terminal 100 that includes a RF receiver circuit having a dynamic range that is controlled in accordance with some embodiments of the present invention.

The exemplary wireless communications terminal 100 shown in FIG. 1 further includes an antenna 102, a RF receiver circuit 110, a Bluetooth communication controller 120, a RF transmitter circuit 130, and other functional circuitry 140. As used herein, the term "controller" can include digital logic circuits including, but not limited to, a gate array, a program code execution circuit (e.g., a microprocessor), discrete logic circuit elements, and/or may include analog circuits.

The RF transmitter circuit 130 may be configured as the transmitter RF front-end that is used when the terminal 100 is transmitting according to the Bluetooth protocol. As explained above, the power level that is transmitted from the RF transmitter circuit 130 may be controlled by, for example, the Bluetooth communications controller 120 in response to control signals received from another communication terminal that is communicating with the terminal 100 through a Bluetooth communication link. The functional circuit 140 may be configured to provide operations that enable the wireless communication terminal to operate as, for example, a wireless headset, a cellular phone, a personal data assistant (PDA), a wireless keyboard and/or mouse, and/or a desktop/laptop/palmtop computer.

The exemplary RF receiver circuit 110, which can function as the Bluetooth RF receiver front-end, includes a low noise amplifier 112, a downconversion mixer 114, a filter 116, and an analog digital converter (ADC) 118. The low noise amplifier 112 is configured to amplify an incoming communication signal from the other communication terminal. The downconversion mixer 114 is configured to down-convert the amplified signal that is output by low noise amplifier 112 to generate a baseband frequency signal. The baseband filter 116 is configured to filter the baseband frequency signal to generate a filtered baseband signal. The ADC 118 is configured to sample the filtered baseband signal to generate a sequence of digital data signal samples.

In accordance with various embodiments, the dynamic range of the RF receiver circuit 110 may be temporarily increased in response to loss of a communication link by controlling the operational characteristics of one or more of the low noise amplifier 112, the downconversion mixer 114, the baseband filter 116, and/or the analog digital converter (ADC) 118. The Bluetooth communications controller 120 may include a receiver dynamic range controller 122 that controls the dynamic range of the RF receiver circuit 110 so as to increase its dynamic range in response to loss of a communications link, and to restore the dynamic range back to a lower operating range after the link has been restored.

Figure 4:
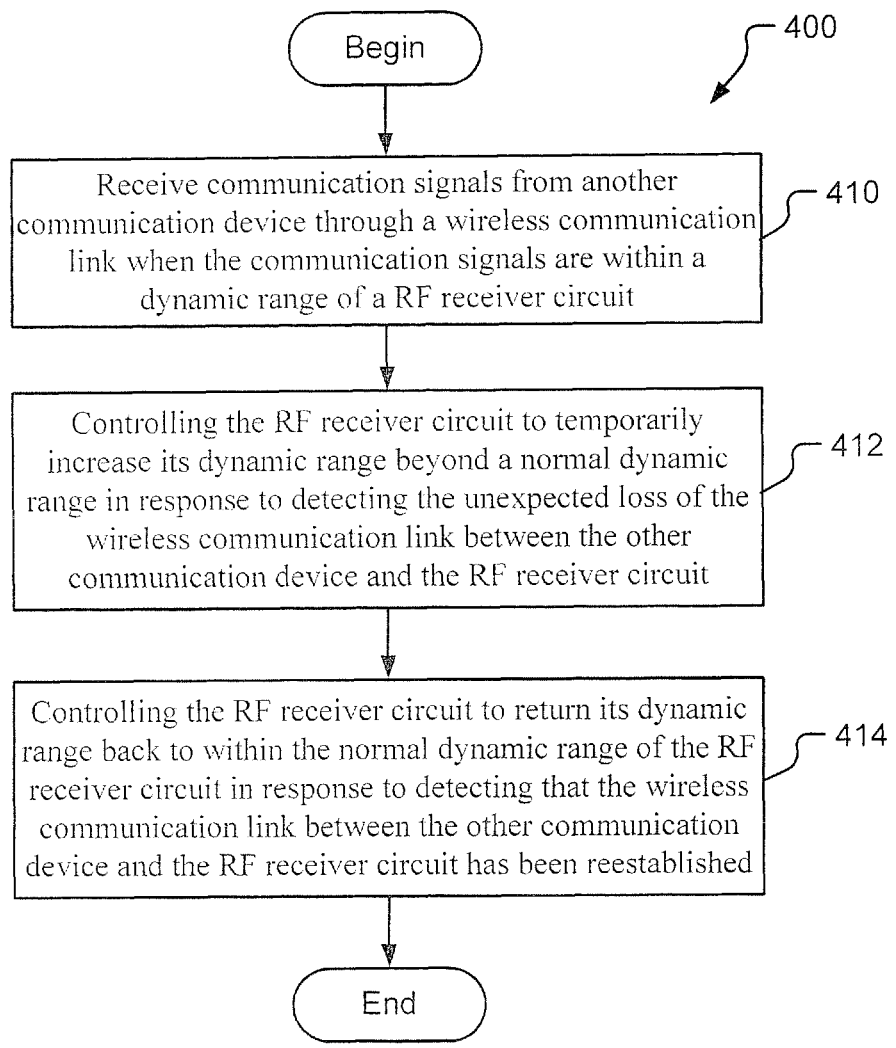
FIG. 4 is a flowchart of operations that may be performed by the RF receiver circuit and a controller in the wireless communication terminal of FIG. 1 to control dynamic range of the RF receiver circuit according to various embodiments.

FIG. 4 is a flowchart of operations 400 that may be performed by the RF receiver circuit 110 and the dynamic range controller 122 to control dynamic range of the RF receiver circuit 110 according to various embodiments. Referring to FIG. 4, the RF receiver circuit 110 receives (Block 410) communication signals from another communication device through a wireless communication link when the communication signals are within the dynamic range of the RF receiver circuit 110. The dynamic range controller 122 controls (Block 412) the RF receiver circuit 110 to temporarily increase its dynamic range in response to detecting an unexpected loss of the wireless communication link between the other communication device and the RF receiver circuit 110. By increasing the dynamic range, the RF receiver circuit 110 may be able to once again properly receive signals from the other communication device and, thereby, be able to reestablish the Bluetooth communication link thereto. In response to the communication link being reestablished, the dynamic range controller 122 controls (Block 414) the RF receiver circuit 110 to decrease its dynamic range.

Figure 5A:
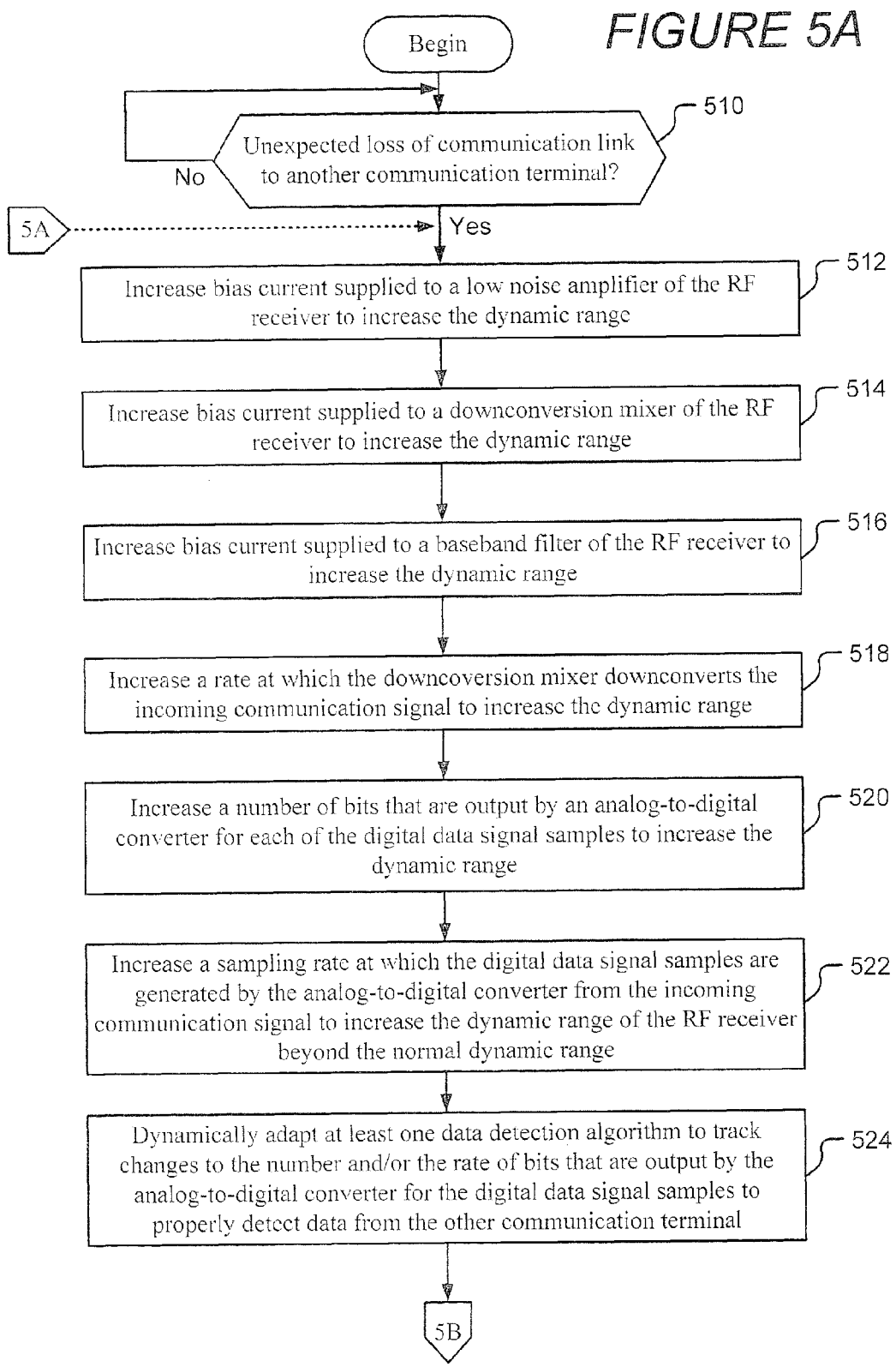

FIGS. 5A and 5B illustrate a flowchart of further operations that may be performed by the RF receiver circuit 110 and the dynamic range controller 122 to control dynamic range of the RF receiver circuit 110 according to various embodiments. Referring to FIGS. 5A and 5B, the dynamic range controller 122 determines (Block 510) when an existing communication link with another communication terminal is unexpectedly lost (i.e., not through a deliberate decision of the terminal 100 to terminate the link).

The Bluetooth communication controller 120, or the dynamic range controller 122 therein, may determine that the communication link has become unexpectedly lost when a communication response is not received from the other communication terminal within a threshold time after transmission of data from the wireless communication terminal 100 to the other communication terminal. Alternatively or additionally, the communication link can be determined to have become unexpectedly lost when bit errors in a data packet received from the other communication terminal exceeds a threshold number.

In response to loss of communication link, the dynamic range controller 122 can control the low noise amplifier 112 to increase the dynamic range of the RF receiver circuit 110. The dynamic range of the RF receiver circuit 110 may be primarily constrained by the operational characteristics of the low noise amplifier 112. For example, the lower limit of the dynamic range may be constrained by the noise floor of the low noise amplifier 112. The sensitivity of the RF receiver circuit 110 may be limited by the receiver signal-to-noise ratio, the noise bandwidth, and the noise factor according to the following equation:

RXsens=SNR+kTB+NF (dBm), where the term RXsens represents the sensitivity of the RF receiver circuit 110, the term SNR is the signal-to-noise ratio, the term k is the Boltzmann constant, the term T is the temperature, the term NF is the noise factor, and the term B is the noise bandwidth. The noise factor (NF) can depend on the operational characteristics and bias current of the low noise amplifier 112. The low noise amplifier 112 may, for example, have a noise factor in the range of 2-5 dB. The receiver sensitivity may be, for example, about −85 dBm.

The upper limit of the dynamic range may be constrained by the operational linearity characteristics of the low noise amplifier 112, which may be primarily limited by the bias current through the input stage of the low noise amplifier 112. A higher bias current may therefore be supplied to the low noise amplifier 112 to create a higher dynamic range for the RF receiver circuit 110, although at the expense of more power consumption.

In accordance with some embodiments, the dynamic range controller 122 increases (Block 512) the bias current that is supplied to the low noise amplifier 112 so as to increase the dynamic range (e.g., the maximum receivable signal level and/or the minimum receivable signal level) of the receiver circuit 110 while trying to reestablish the lost communication link. The dynamic range controller 122 may additionally or alternatively increase the bias current that is supplied to the downconversion mixer 114 (Block 514) and/or to the baseband filter 116 (Block 516) so as to increase the dynamic range of the receiver circuit 110 while trying to reestablish a lost communication link. When controlling the bias current, the dynamic range controller 122 may control the bias current that is supplied to various transistor circuitry of the low noise amplifier 112, the downconversion mixer 114, and/or the baseband filter 116 to regulate the dynamic range of the RF receiver circuit 110.

The dynamic range controller 122 may increase (Block 518) the dynamic range of the RF receiver circuit 110 by increasing a rate at which the downconversion mixer 114 downconverts the incoming communication signal (i.e. when (sub-) sampling down-conversion is applied). The dynamic range of the RF receiver circuit 110 may also depend upon the performance of a local oscillator 113 (LO or VCO). The phase noise behavior of the VCO 113 affects the receiver sensitivity (perturbation of the signal phase, but also by reciprocal mixing). Accordingly, the dynamic range controller 122 can be configured to increase the bias current that is supplied to the VCO 113 to thereby improve its phase noise behavior.

The dynamic range controller 122 may increase the number of data bits (Block 520) that are output by the ADC 118 from each of its samples of the filtered signal from the filter 116 (i.e., increase the conversion resolution of the ADC 118) and/or by increasing the sampling rate (Block 522) of the ADC 118 (i.e., the rate at which digital data signal samples are output from the ADC 118).

When the dynamic range controller 122 varies the number of data bits and/or the sampling rate of the ADC 118, it can also cause the Bluetooth communication controller 120 to adapt (Block 524) the data detection algorithms (e.g., Viterbi detection algorithms), which are used to detect data bits from the other communication terminal in the sequence of digital data signal samples output from the ADC 118, to track changes to the number of data bits and/or to the sampling rate of the ADC 118 to enable the Bluetooth controller 120 to properly detect data bits in the downconverted and sampled signal received from the other communication terminal.

Increasing the dynamic range in this manner may move the level of the received signal to within the increased dynamic range of the receiver circuit 110, so that the signal can be properly detected by the RF receiver circuit 110. The Bluetooth controller 120 and/or the dynamic range controller 122 can determine when the communication link has been reestablished with the other communication terminal (Block 526). While ongoing attempts are made to reestablish the communication link, the dynamic range controller 122 may further increase the dynamic range of the RF receiver circuit 110. For example, the dynamic range controller 122 may repetitively perform the operations of one or more of Blocks 512-524 to further increase the bias current, the downconversion rate, the number of bits output from the ADC 118 for each signal sample, and/or the sampling rate of the ADC 118 until the communication link is determined at Block 526 to have been reestablished.

The Bluetooth controller 120 and/or the dynamic range controller 122 can be configured to transmit power control commands to the other communication terminal to control a transmission power level from the other communication terminal. The dynamic range controller 122 may then be configured to delay reducing the dynamic range of the RF receiver circuit 110 (Block 528) until after detecting that the wireless communication link with the other communication terminal has been reestablished and that the other communication terminal is again responding to the transmitted power control commands.

To decrease the dynamic range of the RF receiver circuit 110, the dynamic range controller 122 may decrease the bias current that is supplied to the low noise amplifier 112 (Block 530), to the downconversion mixer 114 (Block 532), and/or to the baseband filter 116 (Block 534). The dynamic range controller 122 may alternatively or additionally decrease the rate at which the downconversion mixer 114 downconverts the incoming communication signal (Block 536) to decrease the dynamic range.

The dynamic range controller 122 may alternatively or additionally decrease the number of bits that are output by the ADC 118 for each of the digital data signal samples (Block 538) (e.g., return the number of bits to a normal operational number) and/or decrease the sampling rate at which the digital data signal samples are generated by the ADC 118 from the incoming communication signal (Block 540) (e.g., return the sampling rate to a normal operational rate) to decrease the dynamic range. The dynamic range controller 122 may dynamically adapt the data detection algorithm(s) used by the Bluetooth controller 120 to track changes to the number and/or the rate of bits that are output by the ADC 118 for the digital data signal samples to enable proper detection of data from the other communication terminal.

Figure 2:
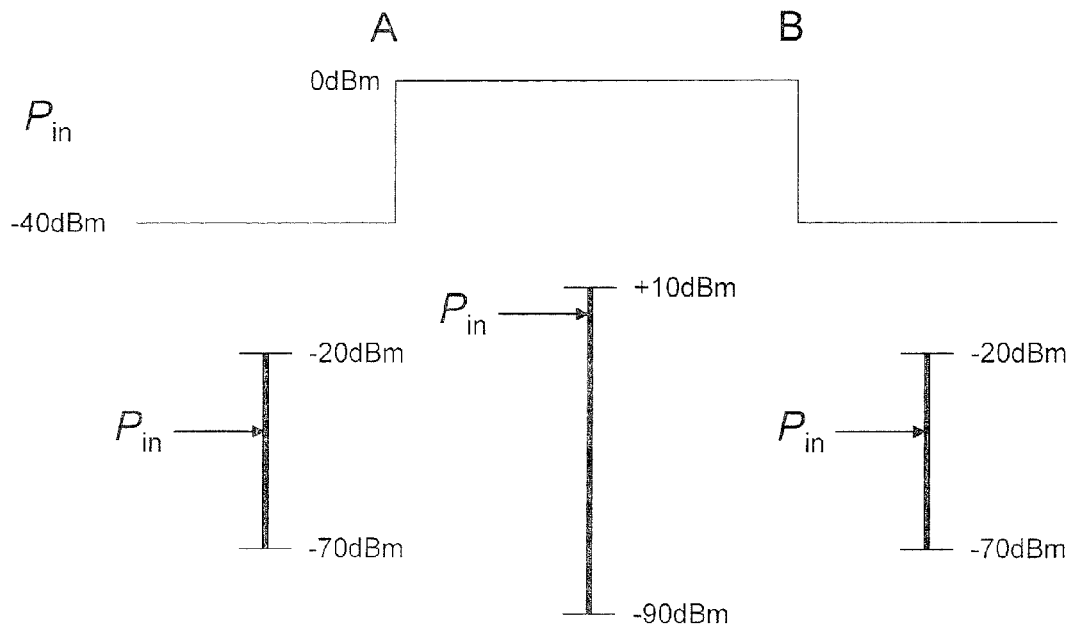
FIG. 2 illustrates graphs that show how dynamic range is controlled in accordance with some embodiments of the present invention in response to loss of a communication link with another terminal due to a sudden reduction in the propagation loss across the communication link.
Figure 3:
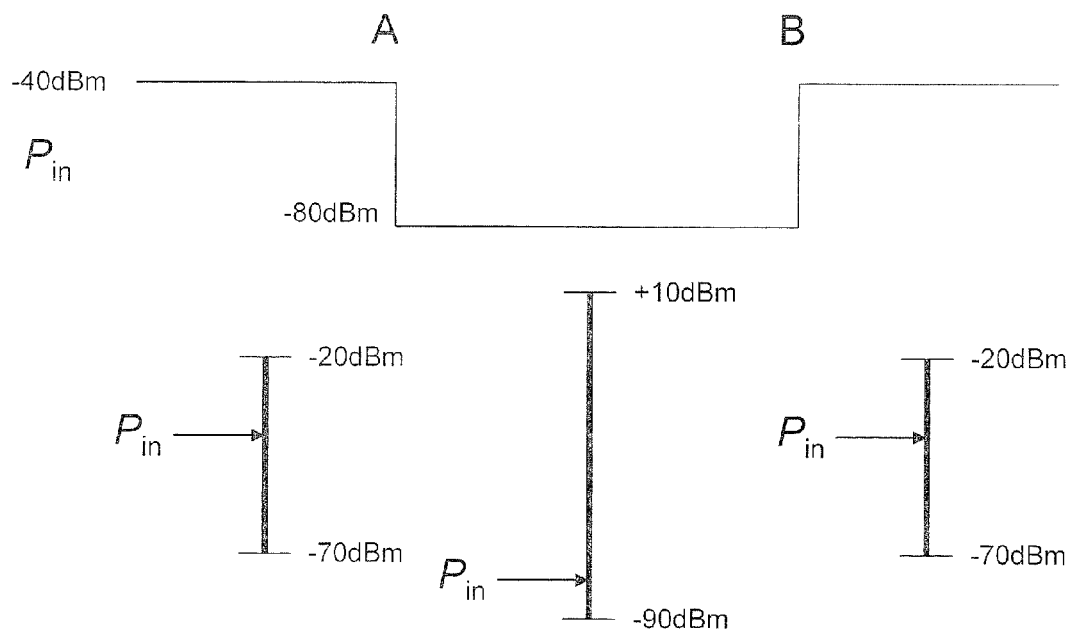
FIG. 3 illustrates graphs that show how dynamic range is controlled in accordance with some embodiments of the present invention in response to loss of a communication link with another terminal due to a sudden increase in the propagation loss across the communication link.

These and other operations and methods that may be carried out by the dynamic range controller 122 and the RF receiver circuit 110 will now be described with regard to FIGS. 2 and 3. FIG. 2 illustrates graphs that show how dynamic range may be controlled in response to a sudden reduction in the propagation loss across a wireless communication link (e.g., terminals moved close together) in accordance with some embodiments of the present invention. FIG. 3 illustrates graphs that show how dynamic range may be controlled in response to a sudden increase in the propagation loss across a wireless communication link (e.g., terminals moved further apart) in accordance with some embodiments of the present invention. In FIGS. 2 and 3, it is assumed that the low noise amplifier 112 has a normal dynamic range of 50 db, a maximum input level of −20 dBm, and a receiver sensitivity of −70 dBm.

Referring to FIG. 2, the received signal power is initially within the normal input range (−40 dBm). However at time instant A, the propagation loss is suddenly reduced by 40 dB. As a result, the received signal power level rises to 0 dBm, which is outside the normal dynamic range of the RF receiver circuit 110. The RF receiver circuit 110 therefore loses the ability to properly detect the signal transmitted by the other terminal. In response to losing the communication link, the dynamic range controller 122 increases the bias currents that are supplied to the low noise amplifier 112, the downconversion mixer 114, and/or the filter 116 so as to increase the dynamic range (e.g., the maximum receiver level and the minimum receiver level) of the receiver circuit 110 while trying to reestablish a lost communication link.

As a result of increasing the bias currents, the dynamic range is increased to 100 dB. Although increasing the dynamic range in this manner may result in additional power consumption by the receiver circuit 110, that increase may occur only occasionally and for only a relatively short duration. As a result of the increased dynamic range, the 0 dBm input signal power level rises to within the operational dynamic range of the RF receiver circuit 110 and, therefore, can be properly detected. The communication link with the other terminal can therefore be restored, and the transmitter of the other terminal can be commanded to lower its transmission power level by 40 dB so that the received signal power level returns to the normal level of −40 dBm. In response to the transmitter of the other terminal lowering its transmission power at time instant B, the dynamic range controller 122 returns the dynamic range of the receiver circuit 110 back to the normal range of 50 dB.

An opposite scenario will now be described with reference to FIG. 3. Referring to FIG. 3, the propagation loss suddenly rises by 40 dB (e.g., the terminals are abruptly moved more distant from each other) at time instant A. The received signal power level drops to a level of −80 dB which is below the normal receiver sensitivity of −70 dBm. The range controller 122 responds to loss of the communications link by increasing the dynamic range of the receiver circuit 110 (e.g., without knowing whether the received signals become too weak or too strong) at time instant B. The newly obtained receiver sensitivity of −90 dBm enables the receiver circuit 110 to once again properly detect the received signal and, thereby, to restore the communication link with the other terminal. The controller 120 commands the other terminal to increase its transmitter power level to a level that is sufficient for the received signal power level to be within a normal range. The dynamic range controller 122 then restores the dynamic range of the receiver circuit 110 back to the normal range.

In the description above, the dynamic range in the receiver was varied based on loss of a communication link and subsequent reestablishment of the communication link. In a similar fashion, the dynamic range may be increased prior to communication link establishment. That is, if no communication link has been established yet, the transmitter power level as well as the propagation loss are unknown to the receiver. For example, in Bluetooth, a receiver carries out a page scan procedure at very low duty cycle to listen for page messages. These page scans could be performed under high dynamic range conditions to increase the probability of detection. Once a communication link has been established, power control will allow the receiver to reduce its dynamic range considerably in order to save power.

Accordingly, in some embodiments, the dynamic range controller 122 can control the RF receiver circuit 110 (such as according to one or more of the operations explained above) to temporarily increase the dynamic range of the RF receiver circuit 110 while carrying out page scans to establish a communication link with another communication terminal, and can then reduce the dynamic range of the RF receiver circuit 110 after the communication link with the other communication terminal has been established.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A wireless communication terminal comprising:
a RF receiver circuit that is configured to receive communication signals from another communication terminal through a wireless communication link when the communication signals are within a dynamic range of the RF receiver circuit;
a controller that is configured to control the RF receiver circuit to temporarily increase the dynamic range of the RF receiver circuit in response to detecting an unexpected loss of the wireless communication link between the other communication terminal and the RF receiver circuit, and to control the RF receiver circuit to decrease the dynamic range of the RF receiver circuit in response to detecting that the wireless communication link between the other communication terminal and the RF receiver circuit has been reestablished.

2. The wireless communication terminal of claim 1, wherein:
the RF receiver circuit comprises a low noise amplifier with a transistor circuit configured to amplify an incoming communication signal from the other communication terminal; and
the controller is further configured to increase bias current supplied to the transistor circuit of the low noise amplifier to increase the dynamic range of the RF receiver circuit in response to detecting the unexpected loss of the wireless communication link, and to decrease the bias current supplied to the transistor circuit of the low noise amplifier in response to detecting that the wireless communication link between the other communication terminal and the RF receiver circuit has been reestablished.

3. The wireless communication terminal of claim 1, wherein:
the RF receiver circuit comprises a low noise amplifier that amplifies an incoming communication signal from the other communication terminal; and
the controller is further configured to increase a power supply voltage to the low noise amplifier to increase the dynamic range of the RF receiver circuit in response to detecting the unexpected loss of the wireless communication link, and to decrease the power supply voltage to the low noise amplifier to decrease the dynamic range of the RF receiver circuit back in response to detecting that the wireless communication link between the other communication terminal and the RF receiver circuit has been reestablished.

4. The wireless communication terminal of claim 1, wherein:
the RF receiver circuit comprises a downconversion mixer with a transistor circuit that down-converts an incoming communication signal from the other communication terminal to a baseband frequency; and the controller is further configured to increase bias current supplied to the transistor circuit of the downconversion mixer to increase the dynamic range of the RF receiver circuit in response to detecting the unexpected loss of the wireless communication link, and to decrease the bias current supplied to the transistor circuit of the downconversion mixer to decrease the dynamic range of the RF receiver circuit in response to detecting that the wireless communication link between the other communication terminal and the RF receiver circuit has been reestablished.

5. The wireless communication terminal of claim 1, wherein:
the RF receiver circuit comprises a downconversion mixer that down-converts an incoming communication signal from the other communication terminal to a baseband frequency; and
the controller is further configured to increase a rate at which the downconversion mixer downconverts the incoming communication signal to increase the dynamic range of the RF receiver circuit in response to detecting the unexpected loss of the wireless communication link, and to decrease the rate at which the downconversion mixer downconverts the incoming communication signal to decrease the dynamic range of the RF receiver circuit in response to detecting that the wireless communication link between the other communication terminal and the RF receiver circuit has been reestablished.

6. The wireless communication terminal of claim 1, wherein:
the RF receiver circuit comprises a baseband filter that filters an incoming communication signal from the other communication terminal, which has been downconverted to a baseband signal, to generate a filtered baseband signal; and
the controller is further configured to increase bias current supplied to the baseband filter to increase the dynamic range of the RF receiver circuit in response to detecting the unexpected loss of the wireless communication link, and to decrease the bias current supplied to the baseband filter to decrease the dynamic range of the RF receiver circuit in response to detecting that the wireless communication link between the other communication terminal and the RF receiver circuit has been reestablished.

7. The wireless communication terminal of claim 1, wherein:
the RF receiver circuit comprises a low noise amplifier, a downconversion mixer, and a filter;
the low noise amplifier is configured to amplify an incoming communication signal from the other communication terminal;
the downconversion mixer is configured to down-convert an incoming communication signal from the other communication terminal to a baseband frequency;
the baseband filter is configured to filter the baseband frequency communication signal to generate a filtered baseband signal; and
the controller is further configured to increase the dynamic range of the low noise amplifier, the downconversion mixer, and/or the baseband filter in response to detecting the unexpected loss of the wireless communication link, and to decrease the dynamic range of the low noise amplifier, the downconversion mixer, and/or the baseband filter in response to detecting that the wireless communication link between the other communication terminal and the RF receiver circuit has been reestablished.

8. The wireless communication terminal of claim 1, wherein:
the RF receiver circuit comprises an analog-to-digital converter that samples an incoming communication signal from the other communication terminal, which has been downconverted to a baseband signal, to generate a sequence of digital data signal samples; and
the controller is further configured to increase a number of bits that are output by the analog-to-digital converter for each of the digital data signal samples to increase the dynamic range of the RF receiver circuit in response to detecting the unexpected loss of the wireless communication link, and to decrease the number of bits that are output by the analog-to-digital converter for each of the digital data signal samples to decrease the dynamic range of the RF receiver circuit in response to detecting that the wireless communication link between the other communication terminal and the RF receiver circuit has been reestablished.

9. The wireless communication terminal of claim 8, wherein:
the controller is further configured to carry out at least one data detection algorithm to detect data bits from the other communication terminal in the sequence of digital data signal samples, and to dynamically adapt the at least one data detection algorithm to track changes to the number of bits that are output by the analog-to-digital converter for each of the digital data signal samples to cause the data detection algorithm to be able to properly detect data bits from the other communication terminal.

10. The wireless communication terminal of claim 9, wherein:
the at least one data detection algorithm comprises a Viterbi data detection algorithm; and
the controller is configured to vary convergence lengths of the Viterbi data detection algorithm to track changes to the number of bits that are output by the analog-to-digital converter for each of the digital data signal samples.

11. The wireless communication terminal of claim 1, wherein:
the RF receiver circuit comprises an analog-to-digital converter that samples an incoming communication signal from the other communication terminal, which has been downconverted to a baseband signal, to generate a sequence of digital data signal samples; and
the controller is further configured to respond to detecting the unexpected loss of the wireless communication link by increasing a sampling rate at which the digital data signal samples are generated by the analog-to-digital converter from the incoming communication signal, and to respond to detecting that the wireless communication link between the other communication terminal and the RF receiver circuit has been reestablished by decreasing the sampling rate at which the digital data signal samples are generated by the analog-to-digital converter from the incoming communication signal.

12. The wireless communication terminal of claim 11, wherein:
the controller is further configured to carry out at least one data detection algorithm to detect data bits from the other communication terminal in the sequence of digital data signal samples, and to dynamically adapt the at least one data detection algorithm to track changes to the sampling rate of the analog-to-digital converter to cause the data detection algorithm to be able to properly detect data bits from the other communication terminal.

13. The wireless communication terminal of claim 1, wherein:
the RF receiver circuit comprises Bluetooth receiver circuit that is configured to operate to establish a Bluetooth communication link with the other communication terminal; and
the controller is further configured to respond to detecting an unexpected loss of the Bluetooth communication link by controlling the Bluetooth receiver circuit to temporarily increase the dynamic range of the Bluetooth receiver circuit, and respond to detecting reestablishment of the Bluetooth communication link with the other communication terminal by controlling the Bluetooth receiver circuit to decrease the dynamic range of the RF receiver circuit.

14. The wireless communication terminal of claim 1, wherein:
the controller is further configured to determine that the wireless communication link has become unexpectedly lost when a communication response is not received from the other communication terminal within a threshold time after transmission of data from the wireless communication terminal to the other communication terminal.

15. The wireless communication terminal of claim 1, wherein:
the controller is further configured to determine that the wireless communication link has become unexpectedly lost when bit errors in a data packet received from the other communication terminal exceeds a threshold number.

16. The wireless communication terminal of claim 1, wherein:
the controller is further configured to transmit power control commands to the other communication terminal to control a transmission power level from the other communication terminal, and is configured to delay controlling the RF receiver circuit to decrease the dynamic range of the RF receiver circuit until after detecting that the wireless communication link with the other communication terminal has been reestablished and after determining that the other communication terminal is again responding to the transmitted power control commands.

17. A method comprising:
receiving communication signals from another communication terminal through a wireless communication link when the communication signals are within a dynamic range of a RF receiver circuit;
controlling the RF receiver circuit to temporarily increase the dynamic range of the RF receiver circuit in response to detecting an unexpected loss of the wireless communication link between the other communication terminal and the RF receiver circuit; and
controlling the RF receiver circuit to decrease the dynamic range of the RF receiver circuit in response to detecting that the wireless communication link between the other communication terminal and the RF receiver circuit has been reestablished.

18. The method of claim 17, further comprising:
transmitting power control commands to the other communication terminal to control a transmission power level from the other communication terminal; and
delaying the control of the RF receiver circuit that decreases the dynamic range of the RF receiver circuit until after detecting that the wireless communication link between the other communication terminal has been reestablished and after determining that the other communication terminal is again responding to the transmitted power control commands.

19. A wireless communication terminal comprising:
a RF receiver circuit that is configured to receive communication signals from another communication terminal through a wireless communication link when the communication signals are within a dynamic range of the RF receiver circuit;
a controller that is configured to control the RF receiver circuit to temporarily increase the dynamic range of the RF receiver circuit while carrying out a page scan to establish a communication link with another communication terminal, and to control the RF receiver circuit to decrease the dynamic range of the RF receiver circuit in response to establishing the communication link with the other communication terminal.

20. The wireless communication terminal of claim 19, wherein:
the RF receiver circuit comprises:
a low noise amplifier that is configured to amplify a communication signal that is incoming from another communication terminal through a wireless communication link;
a downconversion mixer that is configured to down-convert the amplified communication signal to generate a baseband frequency communication signal; and
a baseband filter that is configured to filter the baseband frequency communication signal to generate a filtered baseband signal; and
the controller is further configured to increase dynamic range of at least one of the low noise amplifier, the downconversion mixer, and the baseband filter while carrying out the page scan to establish the communication link with the other communication terminal.

* * * * *

UNITED STATES PATENT AND TRADEMARK OFFICE
CERTIFICATE OF CORRECTION

PATENT NO.        : 8,467,727 B2
APPLICATION NO.   : 12/250883
DATED             : June 18, 2013
INVENTOR(S)       : Haartsen It is certified that error appears in the above-identified patent and that said Letters Patent is hereby corrected as shown below:

In the Specification:
Column 6, Line 11: Please begin a new paragraph after "communication link;" in line 11 so that it reads:
-- gation loss across the communication link;
      FIG. 3 illustrates --

Signed and Sealed this
Third Day of June, 2014

Michelle K. Lee
*Deputy Director of the United States Patent and Trademark Office*